US012667945B2

(12) United States Patent
Chiang

(10) Patent No.: US 12,667,945 B2
(45) Date of Patent: Jun. 30, 2026

(54) QUICK-RELEASE TORQUE DEVICE

(71) Applicant: William Tools Co., Ltd., Taichung City (TW)

(72) Inventor: Shui-Lai Chiang, Taichung City (TW)

(73) Assignee: William Tools Co., Ltd., Taichung City (TW)

( * ) Notice: Subject to any disclaimer, the term of this patent is extended or adjusted under 35 U.S.C. 154(b) by 382 days.

(21) Appl. No.: 18/347,387

(22) Filed: Jul. 5, 2023

(65) Prior Publication Data

US 2024/0075597 A1 Mar. 7, 2024

(30) Foreign Application Priority Data

Sep. 2, 2022 (TW) .................................. 111133275

(51) Int. Cl.
*B25B 23/00* (2006.01)

(52) U.S. Cl.
CPC ................................ *B25B 23/0057* (2013.01)

(58) Field of Classification Search
CPC ......... B25B 13/04; B25B 13/06; B25B 13/46; B25B 13/461; B25B 13/462; B25B 13/463; B25B 13/465; B25B 13/466; B25B 13/48; B25B 15/04; B25B 23/08; B25B 23/12; B25B 23/142; B25B 23/0035; B25B 23/0057; Y10T 279/3481
See application file for complete search history.

(56) References Cited

U.S. PATENT DOCUMENTS

| | | | | | |
|---|---|---|---|---|---|
| 3,240,087 | A * | 3/1966 | Estes | B25B 23/12 | 81/125 |
| 3,630,108 | A * | 12/1971 | Stillwagon, Jr. | B25B 23/12 | 81/125 |
| 2011/0067532 | A1 * | 3/2011 | Hung | B25B 23/12 | 81/125 |
| 2023/0067695 | A1 * | 3/2023 | Ko | B25B 23/12 | |

FOREIGN PATENT DOCUMENTS

| | | | | |
|---|---|---|---|---|
| DE | 10151876 A1 * | 5/2003 | B25B 23/0057 |
| DE | 202013104245 * | 1/2014 | |

* cited by examiner

*Primary Examiner* — Robert J Scruggs
(74) *Attorney, Agent, or Firm* — MUNCY, GEISSLER, OLDS & LOWE, P.C.

(57) ABSTRACT

A quick-release torque device is provided, including: a main body, including a receiving hole, a connecting hole for assembling of a driven member, and a through hole in communication with the receiving hole and the connecting hole, the receiving hole and the connecting hole being respectively opened on opposing sides of the main body; an annular magnetic member, fixedly received in the through hole; a push rod, movably inserted within the through hole and the annular magnetic member.

7 Claims, 7 Drawing Sheets

QUICK-RELEASE TORQUE DEVICE

BACKGROUND OF THE INVENTION

Field of the Invention

The present invention relates to a quick-release torque device.

Description of the Prior Art

Generally, during the fastening operation, it is labor-saving to use driving tools to fasten the fastener. For example, socket wrenches are used to loosen/tighten bolts, nuts or the like; or one of tool bits replaceably inserted in a socket of a driving tool is used to drive various driven members. In order to retain the driven member (such as a tool bit, bolt or nut) in and not fall off the socket of the driving tool, a magnetic member may be disposed on the driving tool.

In addition, in order to facilitate the removal of the tool bit in the socket of the driving tool after operation or during replacement, a mechanism that is movable in the socket to push the tool bit is provided. However, in the conventional driving tools, it is necessary to provide corresponding and associated structures on separate components, resulting in complex structures, difficult processing, manufacturing, and assembling, poor manufacturing efficiency, and high cost.

The present invention is, therefore, arisen to obviate or at least mitigate the above-mentioned disadvantages.

SUMMARY OF THE INVENTION

The main object of the present invention is to provide a quick-release torque device whose components are simple, which is easy to manufacture, assemble and operate, and which greatly improves the production efficiency and lowers costs.

To achieve the above and other objects, a quick-release torque device is provided, including: a main body, including a receiving hole, a connecting hole for assembling of a driven member, and a through hole in communication with the receiving hole and the connecting hole, the receiving hole and the connecting hole being respectively opened on opposing sides of the main body; an annular magnetic member, fixedly received in the through hole; a push rod, movably inserted within the through hole and the annular magnetic member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
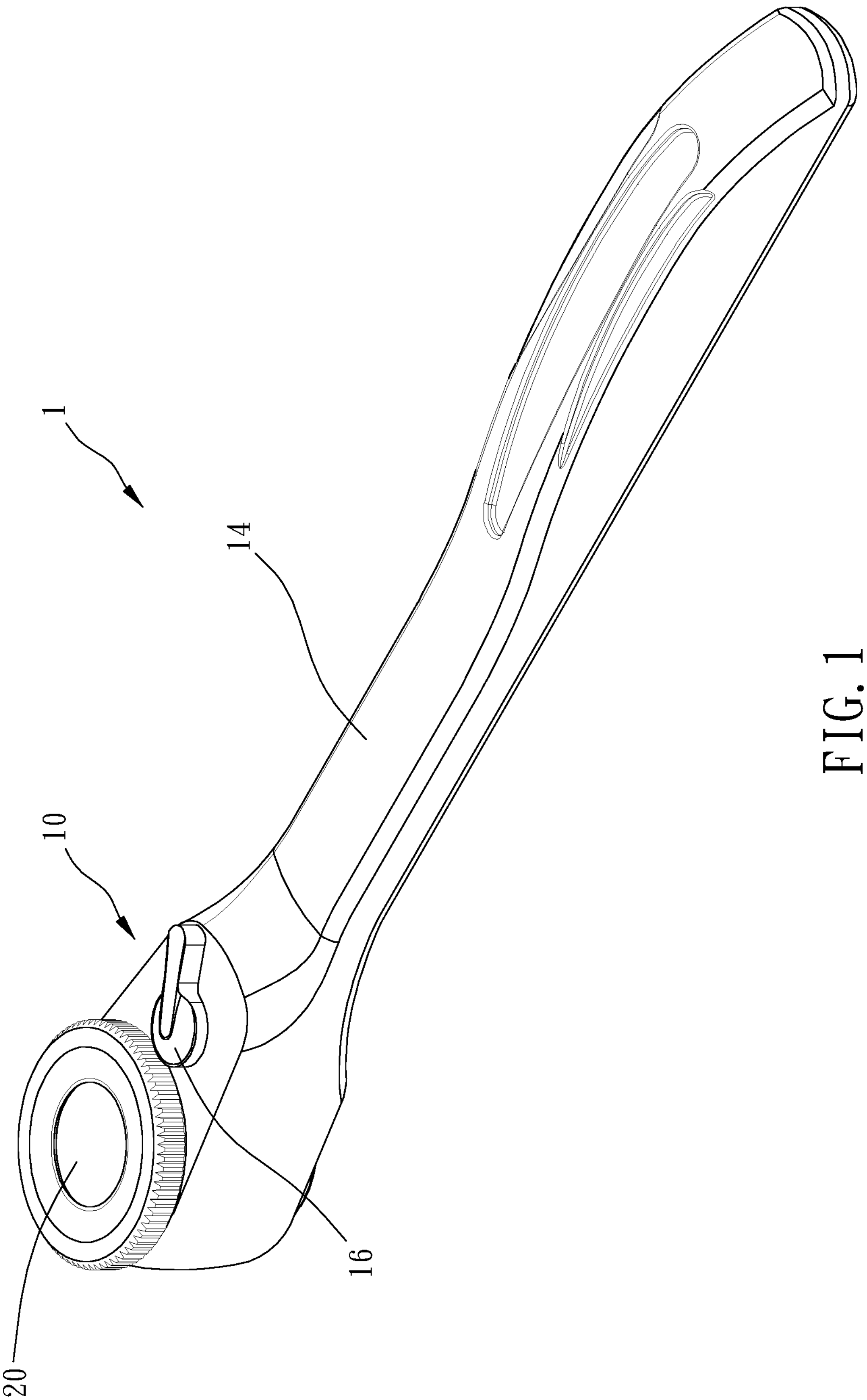
FIG. 1 is a stereogram of an exemplary embodiment of the present invention.
Figure 2:
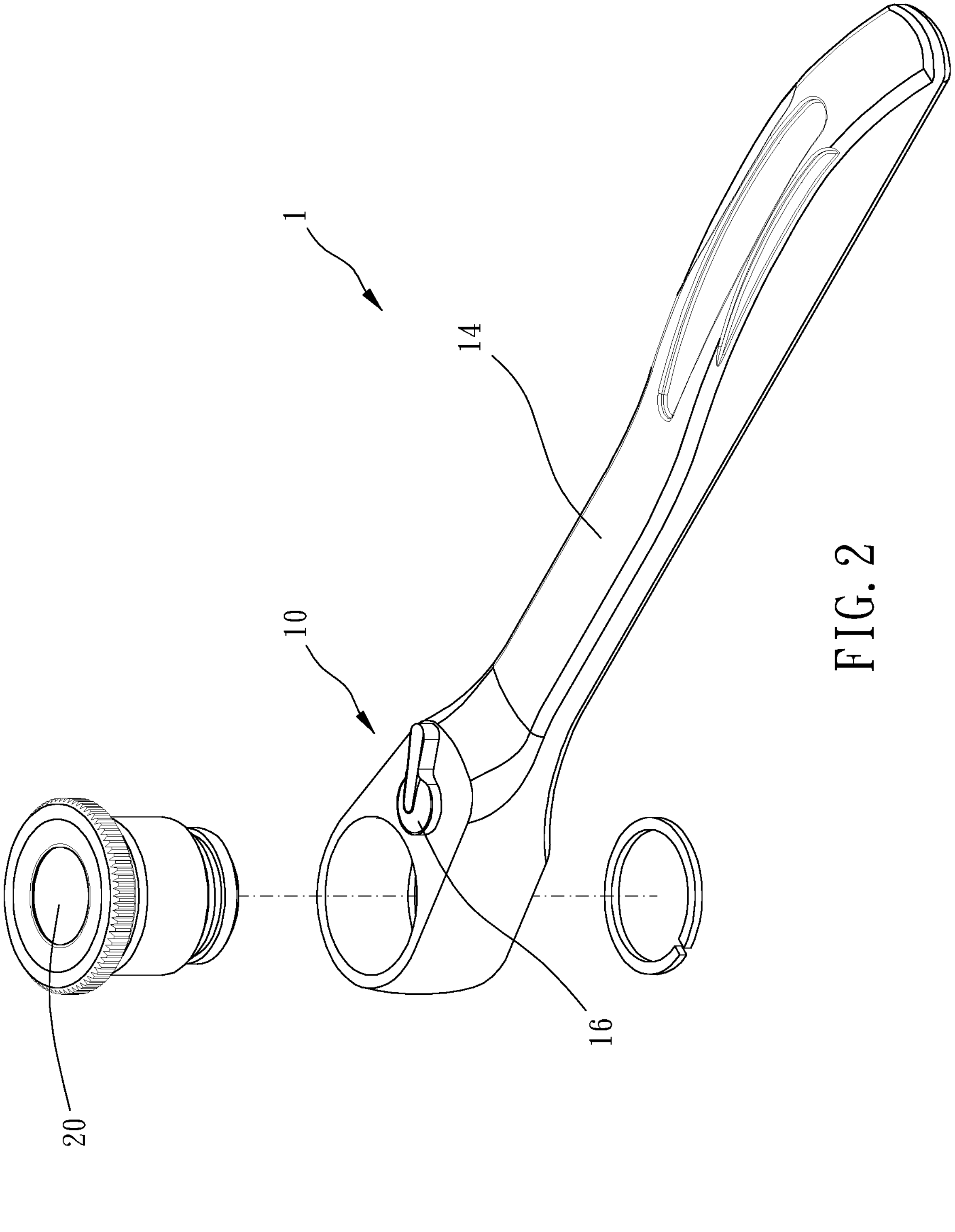
FIG. 2 is a breakdown drawing of an exemplary embodiment of the present invention.
Figure 3:
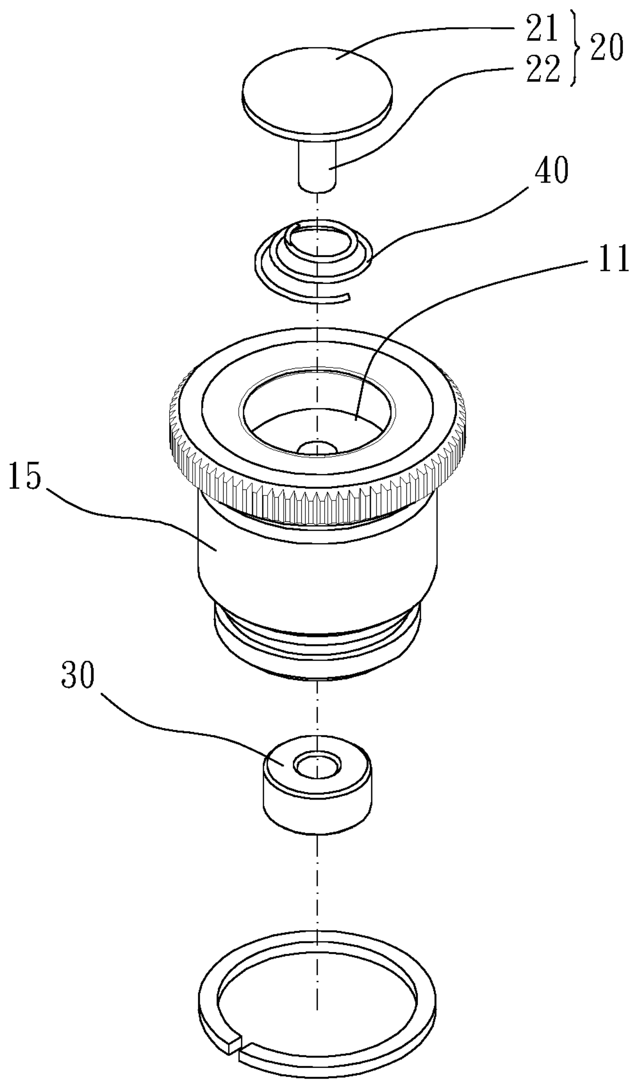
FIG. 3 is a partial breakdown drawing of an exemplary embodiment of the present invention.
Figure 4:
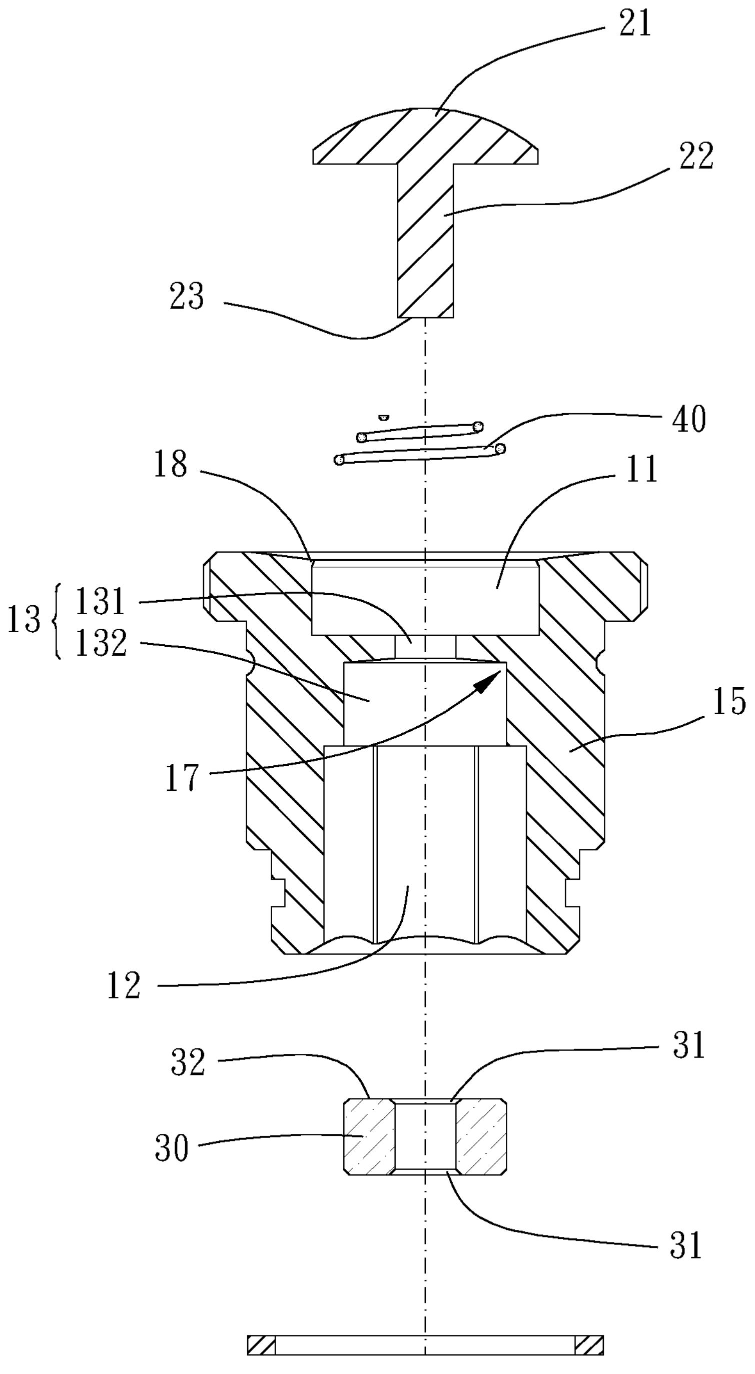
FIG. 4 is a cross-sectional view of FIG. 3.
Figure 5:
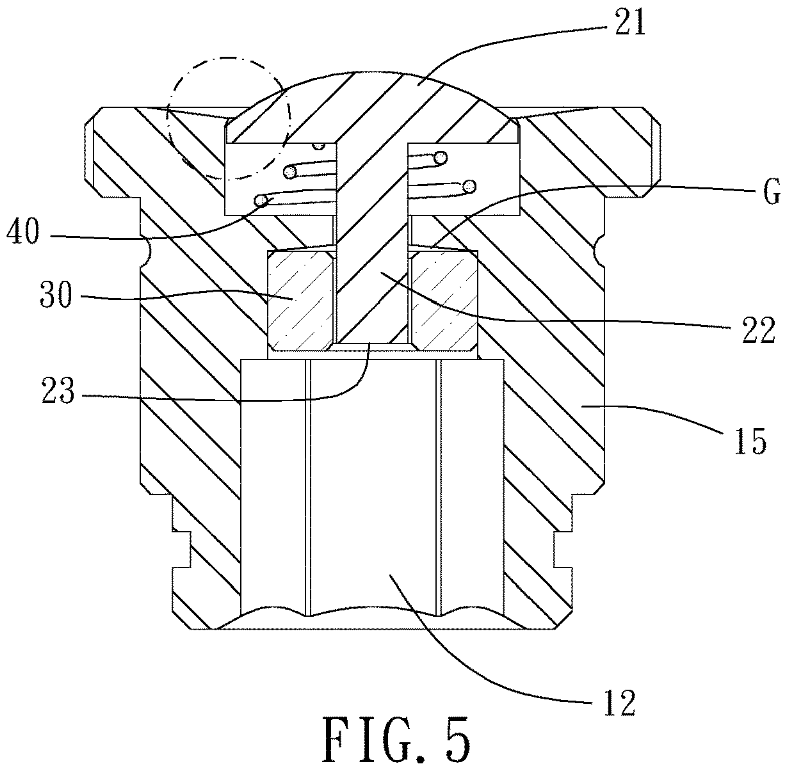
FIG. 5 is another cross-sectional view of an exemplary embodiment of the present invention.
Figure 6:
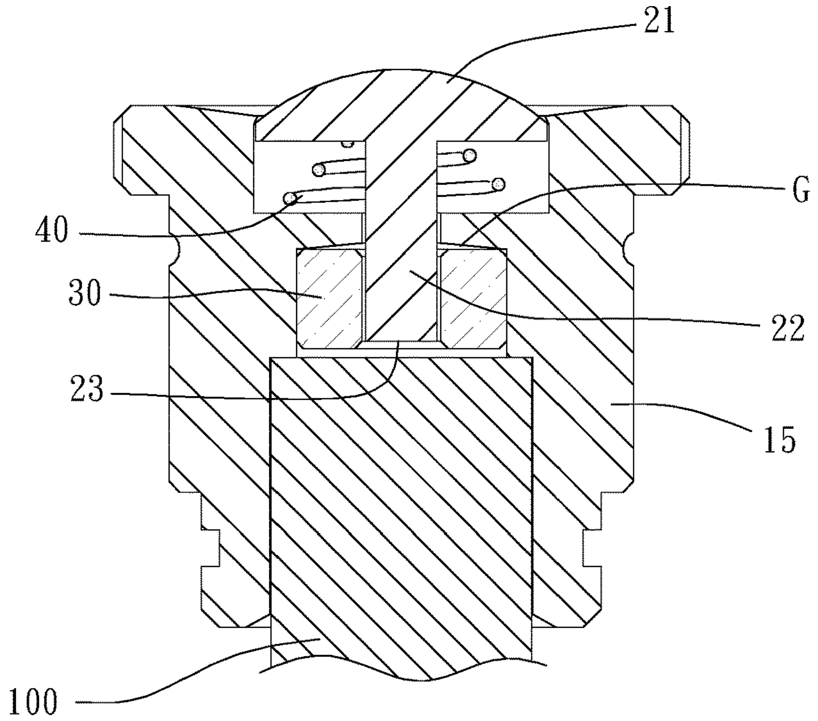
FIGS. 6 and 7 are partial cross-sectional views showing operation of an exemplary embodiment of the present invention.
Figure 7:
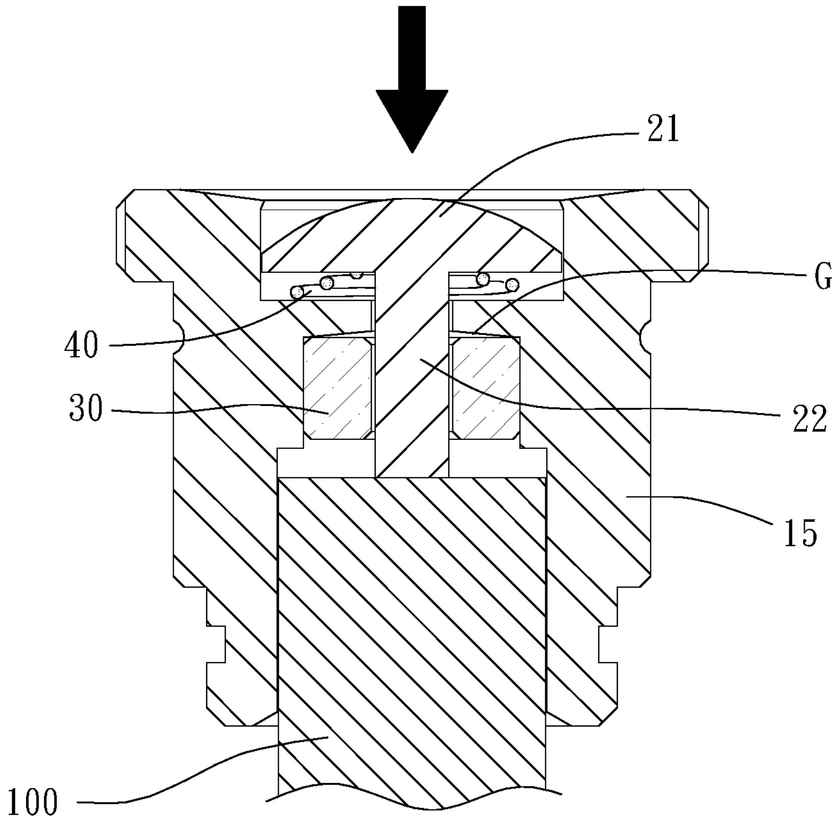
Figure 8:
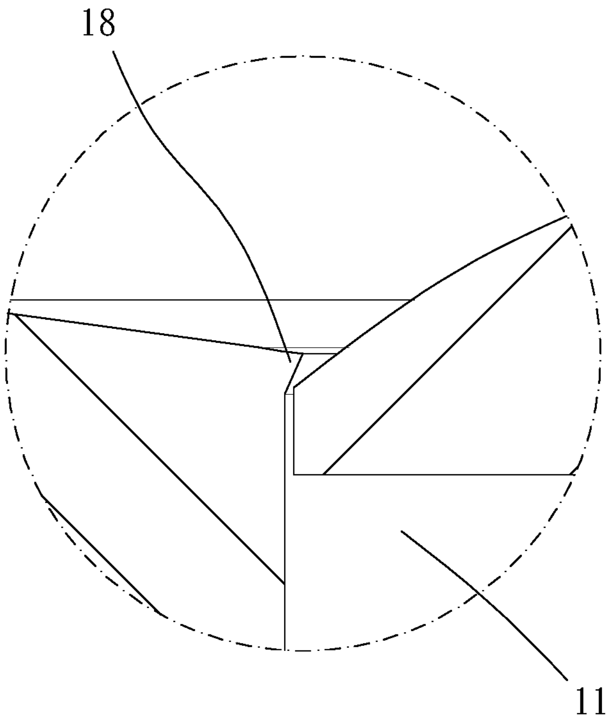
FIG. 8 is a partial enlargement of FIG. 5.

Please refer to FIGS. 1 to 8 for an exemplary embodiment of the present invention. A quick-release torque device 1 of the present invention includes a main body 10, a push rod 20 and an annular magnetic member 30.

The main body 10 includes a receiving hole 11, a connecting hole 12 for assembling of a driven member 100 (such as a tool bit, extension rod or the like), and a through hole 13 in communication with the receiving hole 11 and the connecting hole 12. The receiving hole 11 and the connecting hole 12 are respectively opened on opposing sides of the main body 10. The push rod 20 is movably inserted within the through hole 13 and the annular magnetic member 30. Specifically, the push rod 20 includes a head portion 21 received in the receiving hole 11 and a body portion 22 extending from the head portion 21 and inserted in the through hole 13 and the annular magnetic member 30. The annular magnetic member 30 is fixedly received in the through hole 13. Whereby, the components of the quick-release torque device 1 are simple, it is easy to manufacture and assemble, and it greatly improves the production efficiency and lowers costs. Additionally, by pressing the push rod 20, the driven member 100 can be quickly pushed outward from the connecting hole 12 (FIG. 7) so that the driven member 100 can be easily taken out.

In this embodiment, the quick-release torque device 1 is a driving tool having (such as a ratchet wrench, socket wrench or the like), the main body 10 further includes a handle 14 and a barrel 15 rotatably inserted in the handle 14, and the barrel 15 includes the receiving hole 11, the connecting hole 12 and the through hole 13. The barrel 15 is connected to the handle 14 and unidirectionally rotatable relative to the handle 14. Preferably, the barrel 15 can be controlled to be unidirectionally rotatable in either of two opposing directions by switching a switch member 16 on the quick-release torque device 1, for driving the driven member 100.

Preferably, the head portion 21 is outwardly convex and protrusive beyond the receiving hole 11, which is easy and effective to press the push rod 20. The quick-release torque device 1 further includes an elastic member 40, and the elastic member 40 is a conical coil spring disposed around the body portion 22. The main body 10 further includes a partition 17 extending radially and located between the receiving hole 11 and the connecting hole 12, the through hole 13 is disposed through the partition 17, and the elastic member 40 is disposed between the head portion 21 and the partition 17. As such, after the push rod 20 pressed is released, the push rod 20 can automatically return by utilizing the elastic force of the elastic member 40. An end face 23 of the push rod 20 is retractable to be located within the annular magnetic member 30, and it prevents the driven member 100 from being abutted against by the push rod 20 to lower the magnetic attraction force.

Preferably, the main body 10 further includes a first flange 18 along a periphery of the receiving hole 11 and extending radially inward, and the head portion 21 is axially blockable by the first flange 18 to ensure that the push rod 20 cannot disengage from the receiving hole 11.

In this embodiment, the through hole 13 includes a small diameter section 131 in communication with the receiving hole 11 and a large diameter section 132 in communication with the connecting hole 12, and the annular magnetic member 30 is fixed in the large diameter section 132. The annular magnetic member 30 includes two openings 31 expanding outward 31, and one of the two openings 31 facing the small diameter section 131 has a diametric dimension larger than a diametric dimension of the small diameter section 131. The opening 31 is advantageous for guiding the push rod 20, and the push rod 20 will not touch the fragile corner edge of the annular magnetic member 30 during operation, which can avoid damage to the push rod 20 and the annular magnetic member 30.

In this embodiment, an annular side face 32 of the annular magnetic member 30 and the partition 17 of the main body 10 (may include an annular inclined surface) define an annular gap G therebetween, and the annular gap G expands radially inward. As such, it provides a margin for installation of the annular magnetic member 30 so that the annular magnetic member 30 cannot be easily damaged. Preferably, the annular magnetic member 30 is entirely within the through hole 13 and does not extend to be within the connecting hole 12, and the annular magnetic member 30 and the driven member 100 can be kept to be distanced from each other in a small gap, thus preventing the driven member 100 from directly contacting the annular magnetic member 30 so that the annular magnetic member 30 is well protected.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A quick-release torque device, including:

a main body including a receiving hole, a connecting hole for assembling of a driven member, and a through hole in communication with the receiving hole and the connecting hole, the receiving hole and the connecting hole being respectively opened on opposing sides of the main body;

an annular magnetic member fixedly received in the through hole; and a push rod movably inserted within the through hole and the annular magnetic member;

wherein the main body further includes a handle and a barrel rotatably inserted in the handle, the barrel is integrally formed of one piece, and the barrel includes the receiving hole, the connecting hole and the through hole;

wherein the main body further includes a partition extending radially and located between the receiving hole and the connecting hole, the through hole is disposed through the partition, and the partition is tapered radially inward;

wherein the through hole includes a small diameter section in communication with the receiving hole and a large diameter section in communication with the connecting hole, the large diameter section is located between the small diameter section and the connecting hole, a diametric dimension of the connecting hole is larger than a diametric dimension of the large diameter section, an axial dimension of the large diameter section is larger than an axial dimension of the annular magnetic member, and the annular magnetic member is fixed in the large diameter section;

wherein an annular side face of the annular magnetic member and the main body define an annular gap therebetween, and the annular gap expands radially inward and is conical around the push rod;

wherein the annular magnetic member includes two openings expanding outward and being conical.

2. The quick-release torque device of claim 1, further including an elastic member, wherein the push rod includes a head portion received in the receiving hole and a body portion extending from the head portion and inserted in the through hole and the annular magnetic member, and the elastic member is disposed between the head portion and the partition.

3. The quick-release torque device of claim 2, wherein the head portion is outwardly convex and protrusive beyond the receiving hole.

4. The quick-release torque device of claim 2, wherein the main body further includes a first flange extending along a periphery of the receiving hole and extending radially inward, and the head portion is axially blockable by the first flange.

5. The quick-release torque device of claim 4, wherein the elastic member is a conical coil spring disposed around the body portion; the head portion is outwardly convex and protrusive beyond the receiving hole; the barrel is connected to the handle and unidirectionally rotatable relative to the handle; one of the two openings facing the small diameter section has a diametric dimension larger than a diametric dimension of the small diameter section.

6. The quick-release torque device of claim 1, wherein an end face of the push rod is retractable to be located within the annular magnetic member.

7. The quick-release torque device of claim 1, wherein the annular magnetic member is entirely within the through hole and does not extend to be within the connecting hole.

* * * * *